US010266675B2

(12) United States Patent
Choi et al.

(10) Patent No.: US 10,266,675 B2
(45) Date of Patent: Apr. 23, 2019

(54) THERMOPLASTIC POLYMER COMBINED WITH CARBON NANOMATERIAL AND METHOD OF PREPARING THE SAME

(71) Applicant: LG CHEM, LTD., Seoul (KR)

(72) Inventors: Yeon Sik Choi, Daejeon (KR); Su Min Lee, Daejeon (KR); Chang Hun Yun, Daejeon (KR); Gi Dae Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 767 days.

(21) Appl. No.: 14/419,423

(22) PCT Filed: Aug. 28, 2014

(86) PCT No.: PCT/KR2014/008016
§ 371 (c)(1),
(2) Date: Feb. 3, 2015

(87) PCT Pub. No.: WO2015/030498
PCT Pub. Date: Mar. 5, 2015

(65) Prior Publication Data
US 2016/0046794 A1 Feb. 18, 2016

(30) Foreign Application Priority Data

Sep. 2, 2013 (KR) .................. 10-2013-0104594
Sep. 2, 2013 (KR) .................. 10-2013-0104906

(51) Int. Cl.
*C08K 3/04* (2006.01)
*C08K 5/01* (2006.01)
(Continued)

(52) U.S. Cl.
CPC .................. *C08K 7/06* (2013.01); *B29B 9/16* (2013.01); *C08J 7/06* (2013.01); *C08K 5/05* (2013.01);
(Continued)

(58) Field of Classification Search
CPC . C08K 3/041–3/046; C08K 5/09; C08K 5/17; C08K 5/095; B29B 2009/163; B29B 9/16; C01B 32/168; C01B 32/174; C08L 77/00–77/12; C09D 177/00–177/12; C09J 177/00–177/12
See application file for complete search history.

(56) References Cited

U.S. PATENT DOCUMENTS 9,776,874 B1 * 10/2017 Drzal .................. C01B 31/0423
2004/0016912 A1  1/2004  Bandyopadhyay et al.
(Continued)

FOREIGN PATENT DOCUMENTS

CN       1802712 A     7/2006
CN     101573404 A    11/2009
(Continued)

OTHER PUBLICATIONS

Machine translation of KR 10-2013-0049444 A.*
(Continued)

*Primary Examiner* — Kregg T Brooks
(74) *Attorney, Agent, or Firm* — Dentons US LLP

(57) ABSTRACT

Disclosed are a thermoplastic polymer combined with a carbon nanomaterial and a method of preparing the same. More particularly, a thermoplastic polymer combined with carbon nanomaterial, comprising 0.1 to 15 wt % of a carbon nanomaterial, 0.025 to 30 wt % of a polycyclic aromatic hydrocarbon derivative, and 55 to 99.875 wt % of a thermoplastic polymer, wherein the carbon nanomaterial and the polycyclic aromatic hydrocarbon derivative combine through π-π interaction, and the polycyclic aromatic hydrocarbon derivative covalently combines with the thermoplastic polymer, is disclosed. The thermoplastic polymer combined with the carbon nanomaterial and the method of preparing the same, according to the present invention, exhibit excellent tensile strength, tensile modulus, electromagnetic shielding effects and anti-static effects, and the like.

7 Claims, 1 Drawing Sheet

(51) Int. Cl.

| | | |
|---|---|---|
| *C08K 7/06* | (2006.01) | |
| *C08K 9/04* | (2006.01) | |
| *C08J 3/215* | (2006.01) | |
| *C08J 7/06* | (2006.01) | |
| *C08J 3/22* | (2006.01) | |
| *C08L 101/00* | (2006.01) | |
| *C08L 77/00* | (2006.01) | |
| *B82B 1/00* | (2006.01) | |
| *B82B 3/00* | (2006.01) | |
| *C08K 5/09* | (2006.01) | |
| *C08K 7/24* | (2006.01) | |
| *B29B 9/16* | (2006.01) | |
| *C08K 5/05* | (2006.01) | |
| *C08K 5/10* | (2006.01) | |
| *C08K 5/20* | (2006.01) | |
| *C08K 5/22* | (2006.01) | |
| *C08L 77/02* | (2006.01) | |
| *C08L 77/06* | (2006.01) | |

(52) U.S. Cl.
CPC ............... *C08K 5/09* (2013.01); *C08K 5/10* (2013.01); *C08K 5/20* (2013.01); *C08K 5/22* (2013.01); *C08K 7/24* (2013.01); *B29B 2009/163* (2013.01); *C08J 2377/00* (2013.01); *C08K 2201/011* (2013.01); *C08L 77/02* (2013.01); *C08L 77/06* (2013.01)

(56) References Cited

U.S. PATENT DOCUMENTS

| 2006/0189822 A1* | 8/2006 | Yoon | B82Y 30/00 |
| | | | 560/130 |
| 2011/0162410 A1* | 7/2011 | Low | C08J 9/127 |
| | | | 62/532 |
| 2012/0053288 A1 | 3/2012 | Morishita et al. | |
| 2012/0104329 A1 | 5/2012 | Meyer et al. | |

FOREIGN PATENT DOCUMENTS

| CN | 101717540 A | 6/2010 |
| CN | 102348731 A | 2/2012 |
| CN | 102585425 A | 7/2012 |
| EP | 2881428 A1 | 6/2015 |
| JP | 2010-515779 A | 5/2010 |
| JP | 2012-46582 A | 3/2012 |
| KR | 10-2007-0102266 | 10/2007 |
| KR | 10-0926967 | 11/2009 |
| KR | 10-2011-0125529 A | 11/2011 |
| KR | 10-2012-0023490 | 3/2012 |
| KR | 10-1161715 | 7/2012 |
| KR | 10-2013-0049444 | 5/2013 |
| KR | 10-2013-0049444 A | 5/2013 |
| KR | 10-2014-0026442 A | 3/2014 |
| WO | 2004040590 A2 | 5/2004 |
| WO | 2008/046010 A2 | 4/2008 |
| WO | 2012/138632 A2 | 10/2012 |

OTHER PUBLICATIONS

Bahun et al., "Solubilizing Single-Walled Carbon Nanotubes with Pyrene-Functionalized Block Copolymers," J. Polym. Sci. Part A, 44, 1941-1951 (2006).*
J. Nanosci. Noanotechnol., 2012, 12 (3), p. 1717-1738.
Polymer Journal, 2008. 40(7), p. 577-589.
Polymer Preprints, Japan, 2011, 60(2), p. 3973.
Polymer Preprints, Japan 2012, 61(1), p. 616.
19th Polymer Material Forum , 2010, 19 p. 129-130.
R. Chen et al., J. Am. Chem. Soc. 2001 vol. 123 : pp. 3838-3839, Apr. 18, 2001.

* cited by examiner

THERMOPLASTIC POLYMER COMBINED WITH CARBON NANOMATERIAL AND METHOD OF PREPARING THE SAME

This application is a 35 USC § 371 National Stage entry of International Application No. PCT/KR2014/008016, filed on Aug. 28, 2014, which claims priority to and the benefits of Korean Patent Application Nos. 10-2013-0104594, filed on Sep. 2, 2013 and 10-2013-0104906, filed on Sep. 2, 2013, the entire contents of which are incorporated herein by reference.

TECHNICAL FIELD

The present invention relates to a thermoplastic polymer combined with a carbon nanomaterial and a method of preparing the same. More particularly, the present invention relates to a thermoplastic polymer combined with a carbon nanomaterial having excellent tensile strength, tensile modulus, electromagnetic shielding effects and anti-static effects, and a method of preparing the same on a large scale.

BACKGROUND ART

Carbon nanomaterials may be applied to a variety of fields such as electronic devices, sensors, high-performance composites, and the like due to excellent mechanical properties, electrical selectivity and field emission characteristics thereof.

In particular, since carbon nanomaterials of nanocomposites have nano-size particles, mechanical performance and electrical performance such as strength, wear resistance, or the like may be considerably improved using a small amount of the carbon nanomaterials without any property loss, when the carbon nanomaterials are well dispersed in a polymer matrix.

However, in spite of predicted superior properties of the carbon nanomaterials, mechanical performance or electrical performance of presently prepared carbon nanomaterial composites falls very short of expectations. Such a phenomenon is caused by two elements, namely, dispersion of carbon nanomaterials and compatibility, adhesion, or wetting of nanotubes and polymers.

Carbon nanomaterials have strong electrostatic attraction and thus it is difficult to uniformly disperse the nanomaterials in a polymer matrix. Recently, as a method to effectively disperse the carbon nanomaterials, a method of treating the nanomaterials with ultrasonic waves and the like have been developed and broadly used. However, the carbon nanomaterials are damaged according to intensity of ultrasonic waves and time and thus it is difficult to maintain superior properties and characteristics thereof, and, accordingly, it is difficult to apply the nanomaterials to large-scale production.

In addition, compatibility of the carbon nanomaterials with broadly used thermoplastic polymers is dramatically low, when compared with surface-treated glass fiber or carbon fiber, which are presently used. This is since a portion of a nanotube surface may not interact with thermoplastic polymers. To resolve such a problem, a surface-treatment method through acid treatment and a method of coating noncovalent bonding materials using n-n interaction have been suggested. However, it is difficult to commercialize the methods due to a complex process procedure and high material costs.

DISCLOSURE

Technical Problem

Therefore, the present invention has been made in view of the above problems, and it is one object of the present invention to provide a thermoplastic polymer combined with a carbon nanomaterial having excellent tensile strength, tensile modulus, electromagnetic shielding effects and anti-static effects, and a method of preparing the same in a large scale.

All of the above and other objections may be accomplished by descriptions disclosed below.

Technical Solution

In accordance with one aspect of the present invention, provided is a thermoplastic polymer combined with a carbon nanomaterial, comprising 0.025 to 30 wt % of a polycyclic aromatic hydrocarbon derivative and 55 to 99.875 wt % of a thermoplastic polymer, wherein the carbon nanomaterial and the polycyclic aromatic hydrocarbon derivative are combined by π-π interaction, and the polycyclic aromatic hydrocarbon derivative is covalently combined with the thermoplastic polymer.

In accordance with another aspect of the present invention, the present invention provides a method of preparing a thermoplastic polymer combined with a carbon nanomaterial, the method comprising a) combining a pyrene derivative with the carbon nanomaterial by stirring 1 to 40 wt % of the carbon nanomaterial, 1 to 40 wt % of a polycyclic aromatic hydrocarbon derivative, and 20 to 98 wt % of a solvent using a mechanical mixer; and b) coating a polymer pellet with the carbon nanomaterial combined with the polycyclic aromatic hydrocarbon derivative.

Advantageous Effects

As apparent from the fore-going, the present invention advantageously provides a thermoplastic polymer combined with a carbon nanomaterial having excellent tensile strength, tensile modulus, electromagnetic shielding effects and anti-static effects, and a method of preparing the same on a large scale.

The MWCNT having PBA combined by π-π interaction exhibits a high $O_{1s}$ peak, when compared with pristine MWCNT, and the MWCNT having PBC combined by π-π interaction exhibits a high $Cl_{2p}$ peak. Through this, it can be confirmed that introduction of a reactive group by noncovalent combination (π-π interaction) onto a surface of the MWCNT has been successfully performed.

In addition, the MWCNT having nylon 6,6-g-pyrene combined by π-π interaction exhibits only $N_{1s}$ peak without a $Cl_{2p}$ peak. Through this, it can be confirmed that introduction of a polymer by noncovalent combination (π-π interaction) onto a surface of the MWCNT has been successfully performed.

Figure 1:
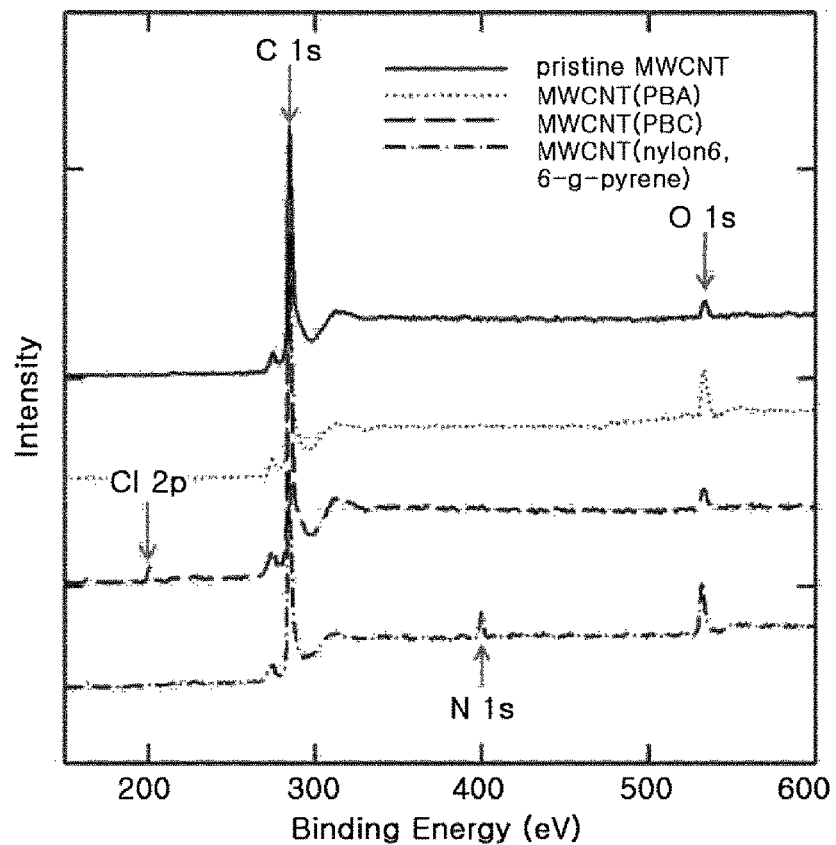
FIG. 1 illustrates ESCA (XPS) spectra of pristine MWCNT, MWCNT (Example 1) having PBA combined by n-n interaction, an MWCNT (Example 2) having PBC combined by n-n interaction, and an MWCNT (Example 2) having nylon 6,6-g-pyrene combined by π-π interaction.
Figure 2:
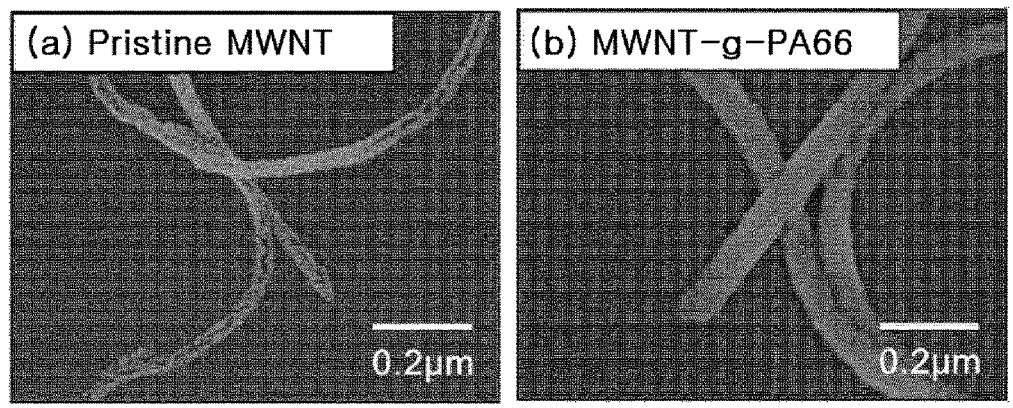

FIG. 2 illustrates an SEM image taken after mixing and extruding (Comparative Example 2) nylon 6,6 and pristine MWCNT, and then treating the same with formic acid, and an SEM image taken after extruding an MWCNT having nylon 6,6-g-pyrene combined by π-π interaction and then treating the same with formic acid.

When the nylon 6,6 and the pristine MWCNT were mixed and extruded (Comparative Example 2), and then treated with formic acid, all of the nylon 6,6 attached to a surface of the MWCNT was removed and thus a thin thread type such as pristine MWCNT was observed. However, when the MWCNT having nylon 6,6-g-pyrene combined by π-π interaction was extruded and then treated with formic acid, the nylon 6,6-g-pyrene existed on a surface of the MWCNT as it was and thus a bar type having a smooth surface and a thick diameter was observed. Through this, it can be confirmed that the nylon 6,6-g-pyrene and the MWCNT strongly combine through n-n interaction.

The nylon 6,6-g-pyrene according to the present invention means a compound covalently combined though reaction of nylon 6,6 and a pyrene derivative (where g means grafting by a covalent bond).

BEST MODE

Hereinafter, the present invention will be described in detail.

A thermoplastic polymer combined with a carbon nanomaterial according to the present invention comprises 0.1 to 15 wt % of a carbon nanomaterial, 0.025 to 30 wt % of a polycyclic aromatic hydrocarbon derivative, and 55 to 99.875 wt % of a thermoplastic polymer, wherein the carbon nanomaterial and the polycyclic aromatic hydrocarbon derivative are combined through π-π interaction and the polycyclic aromatic hydrocarbon derivative is covalently combined with the thermoplastic polymer.

The carbon nanomaterial, for example, may be at least one selected from the group consisting of single walled carbon nanotubes (SWCNT), double walled carbon nanotubes (DWCNT), multi-walled carbon nanotubes (MWCNTs), graphene, and carbon nano fibers.

In addition, in one embodiment, the carbon nanomaterial may be 0.1 to 10 wt %, or 0.1 to 5 wt %. Within this range, electrical conductivity and mechanical properties may be improved.

In one embodiment, the polycyclic aromatic hydrocarbon derivative has 2 to 5, 3 to 5, or 3 to 4 fused benzene rings. Within this range, the polycyclic aromatic hydrocarbon derivative has great improvement in π-π interaction with the carbon nanomaterial.

In one embodiment, the polycyclic aromatic hydrocarbon derivative comprises a functional group which may react with the polymer.

The functional group, for example, may be at least one selected from the group consisting of trialkyl azanium group, carboxylic acid groups, acylchloride groups, hydroxyl groups, amide groups, ester groups. Within this range, the functional group may react and covalently combine with a polymer.

In one embodiment, the polycyclic aromatic hydrocarbon derivative may be present in an amount of 0.1 to 10 wt %, or 0.1 to 5 wt %. Within this range, the polycyclic aromatic hydrocarbon derivative may effectively combine with a carbon nanomaterial.

In one embodiment, a weight ratio of the carbon nanomaterial to the polycyclic aromatic hydrocarbon derivative may be 1:0.1 to 1:1.5, 1:0.2 to 1:0.9, or 1:0.3 to 1:0.7. Within this range, tensile strength, tensile modulus and electrical conductivity are excellent.

The thermoplastic polymer, for example, may be at least one selected from the group consisting of amide-based polymers, ester-based polymers, acrylate-based polymers, polyketone-based polymers, vinyl-based polymers, styrene-based polymers, polyolefins, and polyphenylene ethers.

The amide-based polymers, for example, may be at least one selected from the group consisting of polyamide, polyimide, and polyetheresteramide.

The ester-based polymers, for example, may be at least one selected from the group consisting of polycarbonate, polyester, polybutylene terephthalate, polyethylene terephthalate, poly(ester) urethane, and polyether ester.

The acrylate-based polymers, for example, may be polyacrylate, polymethyl methacrylate, or a mixture thereof.

The polyketone-based polymers, for example, may be polyaryletherketone, polyetheretherketone, or a mixture thereof.

The vinyl-based polymers, for example, may be polyvinyl chloride, polyvinylidene fluoride, or a mixture thereof.

The styrene-based polymers, for example, may be at least one selected from the group consisting of polystyrene, styrene-butadiene-styrene copolymer, styrene-isoprene-styrene copolymer, styrene-ethylene-butadiene-styrene copolymer, and styrene-butadiene copolymer.

In addition, the thermoplastic polymer may be, for example, 40 to 99.9 wt %, 70 to 99.9 wt %, or 90 to 99.9 wt %. Within this range, mass production of extruding and injecting processes is excellent.

In one embodiment, the thermoplastic polymer combined with a carbon nanomaterial according to the present invention is an extrudate. In this case, the thermoplastic polymer is a master batch type and thus may be easily moved, and may be variously applied.

The method of preparing the thermoplastic polymer combined with the carbon nanomaterial according to the present invention comprises a) combining the carbon nanomaterial with a pyrene derivative by stirring 1 to 40 wt % of the carbon nanomaterial, 1 to 40 wt % of a polycyclic aromatic hydrocarbon derivative, and 20 to 98 wt % of a solvent, using a mechanical mixer; and b) coating the carbon nanomaterial combined with the polycyclic aromatic hydrocarbon derivative on a polymer pellet. In this case, a large-scale production may be easily carried out.

In one embodiment, step (a) may include combining the pyrene derivative with the carbon nanomaterial by stirring 10 to 30 wt % of the carbon nanomaterial, 10 to 30 wt % of the polycyclic aromatic hydrocarbon derivative, and 40 to 80 wt % of a solvent using a mechanical mixer. Within this range, the carbon nanomaterial may be uniformly coated with the polycyclic aromatic hydrocarbon derivative.

In addition, the method of preparing the thermoplastic polymer combined with the carbon nanomaterial according to the present invention comprises preparing a polymer pellet coated with a combined body of the polycyclic aromatic hydrocarbon derivative and the carbon nanomaterial by physically fixing i) 0.1 to 15 wt % of the carbon nanomaterial, ii) 0.025 to 30 wt % of the polycyclic aromatic hydrocarbon derivative, and iii) 10 to 99.775 wt % of a polymer pellet. In this case, large-scale production is possible and, during an extrusion process, easy addition may be carried out, when compared with adding the carbon nanomaterial in a dust state.

In one embodiment, the physical fixation may be carried out by stirring in a solution state.

In another embodiment, the physical fixation may be carried out by applying additional thermal energy to the solution state.

In another embodiment, the physical fixation may be carried out using oxygen plasma ($O_2$).

In yet another embodiment, the physical fixation may be carried out through ultrasonic wave mixing.

In addition, the physical fixation may be performed by stirring with a mechanical mixer to apply striking energy. In particular, by applying striking energy with the mechanical mixer, a large amount of the carbon nanomaterial may be uniformly fixed.

As a specific example, the mechanical mixer may be a mechanical mixer, a magnetic mixer, a homogenizer, a ball-mill, and any mixer types which may internally mix.

In another embodiment, the physical fixation is carried out using at least one solid-phase material selected from a zirconia ball, and a polymer pellet advantageously to apply striking energy.

The physical fixation may be carried out with or without a solvent.

The solvent, for example, may be 0.1 to 30 wt % or 0.1 to 20 wt %. Within this range, the combined body of the carbon nanomaterial is effectively coated on a polymer pellet. In this case, such that all ingredients of steps (i) to (iii) are 100 wt %, in step (iii), an amount of the polymer pellet may be 25 to 99.775 wt % or 35 to 99.775 wt %.

In step (i), a weight ratio of the carbon nanomaterial to the solvent, for example, may be 1:0.1 to 1:10, 1:0.5 to 1:8, or 1:2 to 1:5. Within this range, the combined body of the carbon nanomaterial may be effectively coated on the polymer pellet.

In one embodiment, the method of preparing the thermoplastic polymer combined with the carbon nanomaterial according to the present invention may further comprise melting and extruding the polymer pellet coated with the combined body of the polycyclic aromatic hydrocarbon derivative and the carbon nanomaterial. In this case, a master batch pellet, in which a carbon nanomaterial is highly dispersed, may be prepared and thus may be used in a variety of fields in which application of a carbon nanomaterial is required.

The carbon nanomaterial, for example, may be at least one selected from the group consisting of carbon nanotubes, graphene, and carbon nano fibers.

The polycyclic aromatic hydrocarbon derivative, for example, has 2 to 5, 3 to 5, or 3 to 4 fused benzene rings. Within this range, $\pi$-$\pi$ interaction with the carbon nanomaterial is the most effective.

In one embodiment, the polycyclic aromatic hydrocarbon derivative comprises a functional group which may react with the polymer.

The functional group may be at least one selected from the group consisting of a trialkyl azanium group, a carboxylic acid group, an acylchloride group, a hydroxyl group, an amide group, an ester group. In this case, depending on the functional group types, a variety of thermoplastic polymers may covalently combine with the functional group under specific conditions.

The polycyclic aromatic hydrocarbon derivative, for example, may be at least one selected from the group consisting of 1-pyrene-butyrylcholine (PBC), 1-pyrene-butyric acid(1-pyrene-butyric acid; PBA) and other synthesizable pyrene polymers. In this case, depending on the polycyclic aromatic hydrocarbon derivative types, a variety of thermoplastic polymers may covalently combine with the polycyclic aromatic hydrocarbon derivative under a specific condition.

The thermoplastic polymer, for example, may be at least one selected from the group consisting of amide-based polymers, ester-based polymers, acrylate-based polymers, polyketone-based polymers, vinyl-based polymers, styrene-based polymers, polyolefins, and polyphenylene ethers, and specific examples thereof have been described above.

The polyamide, for example, may be at least one selected from the group consisting of nylon 4.6, nylon 6, nylon 6.6, nylon 6.10, nylon 7, nylon 8, nylon 9, nylon 11, nylon 12, nylon 46, MXD 6, amorphous polyamide, and copolymerized polyamide.

In one embodiment, the copolymerized polyamide is polymerized comprising two or more polyamide monomers of the other polyamides.

In one embodiment, the solvent may be an organic solvent or an inorganic solvent which does not dissolve the polymer pellet.

In another embodiment, the solvent may be at least one selected from the group consisting of water, ethanol, methanol, and THF. In this case, the carbon nanomaterial is easily dissolved while not dissolving amide-based polymers.

In another embodiment, the solvent may be at least one selected from the group consisting of chloroform, toluene, and benzene.

The thermoplastic polymer combined with the carbon nanomaterial according to the present invention is prepared in accordance with the method of preparing the thermoplastic polymer combined with the carbon nanomaterial according to the present invention.

Now, the present invention will be described in more detail with reference to the following examples. These examples are provided only for illustration of the present invention and should not be construed as limiting the scope and spirit of the present invention.

EXAMPLE

Specifications of each of ingredients and additives used in Examples and Comparative Examples below are as follows:

(A) Polyamide Resin

LUMID GP-1000B available from LG Chemical in Korea was used.

(B) Carbon Nanotube

As a multi-walled carbon nanotube (MWCNT) having an average outer diameter of 5 to 30 nm and an average length of 1 to 25 μm, NC-7000 available from Nanocyl was used.

Examples 1 to 2 and Comparative Examples 1 to 5

Each of ingredients and weights was mixed according to each mixing method as described Table 1 below and then was extruded with a polyamide resin at 280 in a twin-screw extruder (L/D=42, Φ=40 mm), resulting in preparation of pellets. The prepared pellets were injected at an injection temperature of 280 in an injection machine, resulting in preparation of specimens.

The prepared specimens were incubated at 23, for 48 hours under a relative humidity of 50% and then properties and electrical conductivity thereof were measured according to American Standard Test Method (ASTM). Results are summarized in Table 1 below.

Covalent bonds of prepared pyrene derivatives and thermoplastic polymers were confirmed using ESCA (XPS). In this regard, the bonds of the pyrene derivatives and the polyamide were confirmed through an $N_{1s}$ peak by a bond of an amine group in the polyamide, or amide.

Example 3

A specimen was prepared in the same manner as in Example 1, except that, as a solvent, water was used instead of methanol. Properties and electrical conductivity of the prepared specimen are summarized in Table 2 below.

Test Example

Characteristics of specimens prepared according to Examples 1 to 3 and Comparative Examples 1 to 6 were measured according to methods below. Results are summarized in Tables 1 and 2 below.

Preparation efficiency: an amount of a sample prepared through treatment per day was measured using each of a general laboratory-scale mechanical mixer (capacity: 4 kg) and ultrasonic wave treatment device (capacity: 500 g).

Tensile strength, tensile modulus: tensile strength and tensile modulus of a specimen having a thickness of 3.2 mm were estimated according to ASTM D638.

Surface specific resistance ($\Omega$/CM): using an SRM-100 available from PINION, surface resistance of a specimen was measured according to ASTM D257.

Electromagnetic wave shield (dB): electromagnetic wave shielding performance of a 3 mm specimen was measured in a 1 GHz area according to ASTM D4935.

(Comparative Example 1 to 3) and the case of using a large amount of the solvent (Comparative Example 4).

In addition, it can be confirmed that the thermoplastic polymers combined with carbon nanomaterials (Examples 1 to 3) according to the present invention exhibit five times or more the preparation efficiency than the cases using an ultrasonic wave mixer (Comparative Example 5).

For reference, ultrasonic wave treatment devices have limitations in scale-up (capacity) thereof, unlike mechanical mixers. In addition, although the capacities of the ultrasonic wave treatment devices are increased, it may be difficult to uniformly stir due to characteristics of ultrasonic waves.

In addition, as Comparative Example 4, when a large amount of solvent is added, carbon nanomaterials agglomerate. Accordingly, it is difficult to induce uniform reaction with a polymer pellet, thereby reducing properties. In addition, when ultrasonic waves are used as in Comparative Example 5, lengths of carbon nanomaterials are reduced during an ultrasonic wave treatment process and thus tensile strength may be somewhat decreased.

TABLE 1

| | | Example | | Comparative Example | | | | |
|---|---|---|---|---|---|---|---|---|
| | | 1 | 2 | 1 | 2 | 3 | 4 | 5 |
| Ingredients | MWNT | | | | | | | ○ |
| | Pyrene derivatives | PBA | PBC | X | X | Pyrene | PBA | PBA |
| | Solvent (methanol) | ○ | ○ | ○ | ○ | ○ | Large amount | ○ |
| Mixing methods | Mixers | Mechanical type | | Mechanical type | | | | Ultrasonic waves |
| | Stirring time (h) | 12 | 12 | 12 | 12 | 12 | 12 | 12 |
| Properties | Preparation efficiency (kg/day) | 50 | 50 | 50 | 50 | 50 | 50 | 0.001 |
| | Tensile strength (MPa) | 1898 | 1899 | 1606 | 1686 | 1786 | 1607 | 1890 |
| | Tensile modulus (GPa) | 68 | 75 | 59 | 64 | 58 | 60 | 69 |
| | Surface specific resistance ($\Omega$/cm) | $10^8$ | $10^8$ | $>10^{13}$ | $10^{10}$ | $10^9$ | $10^{10}$ | $10^8$ |
| | Electromagnetic wave shield (dB) | 8 | 8 | 0 | 4 | 6 | 5 | 8 |

(※ ○: used within an amount range according to the present invention, X: not used, Large amount: used in an amount range exceeding the amount range according to the present invention)

TABLE 2

| | | Example 3 |
|---|---|---|
| Ingredient | MWNT | ○ |
| | Pyrene derivative | PBA |
| | Solvent | Water |
| Mixing method | Mixer | Mechanical type |
| | Stirring time (h) | 12 |
| Properties | Preparation efficiency (kg/day) | 50 |
| | Tensile strength (MPa) | 1899 |
| | Tensile modulus (GPa) | 70 |
| | Surface specific resistance ($\Omega$/cm) | $10^8$ |
| | Electromagnetic wave shielding (dB) | 8 |

As shown in Table 1, it can be confirmed that the thermoplastic polymers combined with the carbon nanomaterials (Examples 1 to 3) according to the present invention exhibit excellent effects in mechanical strength, electrical conductivity and electromagnetic wave shielding, when compared with the cases not containing pyrene derivatives

What is claimed is:

1. A composite material formed from a composition comprising, in combination: 55 to 99.875 wt % of an amide-based polymer polymer, 0.1 to 15 wt% of a carbon nanomaterial, and 0.025 to 30 wt % of at least one of 1-pyrene-butyrylcholine and 1-pyrene-butyric acid, wherein the carbon nanomaterial and the at least one of the 1-pyrene-butyrylcholine and the 1-pyrene-butyric acid are combined through π-π interaction, and the at least one of the 1-pyrene-butyrylcholine and the 1-pyrene-butyric acid and the amide-based polymer are covalently bonded.

2. The composite according to claim 1, wherein the carbon nanomaterial is at least one selected from the group consisting of single walled carbon nanotubes, double walled carbon nanotubes, multi-walled carbon nanotubes, graphene, and carbon nano fibers.

3. The composite according to claim 1, wherein the amide-based polymer combined with the carbon nanomaterial is an extrudate.

4. The composite according to claim 1, wherein a weight ratio of the carbon nanomaterial to the at least one of the 1-pyrene-butyrylcholine and the 1-pyrene-butyric acid is 1:0.1 to 1:1.5.

5. The composite according to claim 1, wherein the amide-based thermoplastic polymer comprises at least one of: nylon 4, 6; nylon 6; nylon 6, 6; nylon 6, 10; nylon 7; nylon 8; nylon 9; nylon 11; nylon 12; nylon 46; and XD 6; amorphous polyamide; and copolymerized polyamide.

6. The composite according to claim 1, wherein the amide-based thermoplastic polymer comprises nylon 6, 6.

7. The composite according to claim 1, wherein the at least one of the 1-pyrene-butyrylcholine and the 1-pyrene-butyric acid are bonded to an amine group in the amide-based polymer.

* * * * *